US012579467B2

(12) United States Patent
Chen et al.

(10) Patent No.: US 12,579,467 B2
(45) Date of Patent: Mar. 17, 2026

(54) DECENTRALIZED CROSS-NODE LEARNING FOR AUDIENCE PROPENSITY PREDICTION

(71) Applicant: Microsoft Technology Licensing, LLC, Redmond, WA (US)

(72) Inventors: Boyi Chen, Cupertino, CA (US); Tong Zhou, Sunnyvale, CA (US); Siyao Sun, Santa Clara, CA (US); Lijun Peng, Mountain View, CA (US); Xinruo Jing, Foster City, CA (US); Vakwadi Thejaswini Holla, San Jose, CA (US); Yi Wu, Palo Alto, CA (US); Pankhuri Goyal, San Jose, CA (US); Souvik Ghosh, Saratoga, CA (US); Zheng Li, Palo Alto, CA (US); Yi Zhang, Los Altos, CA (US); Onkar A. Dalal, Santa Clara, CA (US); Jing Wang, Los Altos, CA (US); Aarthi Jayaram, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 990 days.

(21) Appl. No.: 17/735,020

(22) Filed: May 2, 2022

(65) Prior Publication Data

US 2023/0351247 A1 Nov. 2, 2023

(51) Int. Cl.
*G06N 20/00* (2019.01)
(52) U.S. Cl.
CPC .................................... *G06N 20/00* (2019.01)

(58) Field of Classification Search
CPC .......... G06N 3/08; G06N 3/045; G06N 3/048; H04W 12/02; H04W 12/033; H04W 12/61
See application file for complete search history.

(56) References Cited

U.S. PATENT DOCUMENTS 11,138,340 B1 * 10/2021 Blum .................... G06F 21/604
11,216,580 B1 * 1/2022 Holboke ............. G06F 21/6245
(Continued)

OTHER PUBLICATIONS

Yang, et al., "Applied Federated Learning: Improving Google Keyboard Query Suggestions", Google LLC, Dec. 7, 2018, 9 Pages.
(Continued)

*Primary Examiner* — Barbara M Level
(74) *Attorney, Agent, or Firm* — Nicholson De Vos Webster & Elliott LLP

(57) ABSTRACT

Embodiments of the disclosed technologies receive a first-party trained model and a first-party data set from a first-party system into a protected environment, receive a first third-party data set into the protected environment, and, in a data clean room, joining the first-party data set and the first third-party data set to create a joint data set for the particular segment, tuning a first-party trained model with the joint data set to create a third-party tuned model, sending model parameter data learned in the data clean room as a result of the tuning to an aggregator node, receiving a globally tuned version of the first-party trained model from the aggregator node, applying the globally tuned version of the first-party trained model to a second third-party data set to produce a scored third-party data set, and providing the scored third-party data set to a content distribution service of the first-party system.

20 Claims, 6 Drawing Sheets

(56) References Cited

U.S. PATENT DOCUMENTS

| | | | |
|---|---|---|---|
| 12,277,113 B2 * | 4/2025 | McCray | G06F 16/25 |
| 2021/0125051 A1 * | 4/2021 | Linton | G06F 21/602 |
| 2021/0403004 A1 * | 12/2021 | Alvarez | G06V 20/597 |
| 2022/0108026 A1 * | 4/2022 | Ortiz | G06F 12/1408 |
| 2022/0414267 A1 * | 12/2022 | Bennati | H04L 9/0819 |
| 2024/0005341 A1 * | 1/2024 | Ouyang | G06N 20/00 |

OTHER PUBLICATIONS

Bonawitz et al., "Towards Federated Learning at Scale: System Design", Proceedings of the 2nd SysML Conference, Palo Alto, CA, USA, 2019, 15 pages.

* cited by examiner

300

NODE 1 CLEAN ROOM 208-1, SEGMENT 1

MODEL TRAINING PIPELINE 302

DATA READER 304 → DATA PRE-PROCESSOR 306 → MODEL TRAINER 308

COPY OF FIRST PARTY DATA 212

THIRD PARTY DATA 214

MODEL SCORING PIPELINE 310

DATA READER 312 → DATA PRE-PROCESSOR 314 → MODEL SCORING 316

AGGREGATOR NODE 144

NODE 1 MODEL PARAMETER DATA 310-1

COPY OF FIRST-PARTY MODEL 206

MODEL UPDATES AGGREGATOR 318

UPDATED FIRST-PARTY MODEL 146

NODE N MODEL PARAMETER DATA 310-N

NODE 1 CLEAN ROOM 208-1, SEGMENT 2

NODE N CLEAN ROOM 208-N, 1

Figure 5:
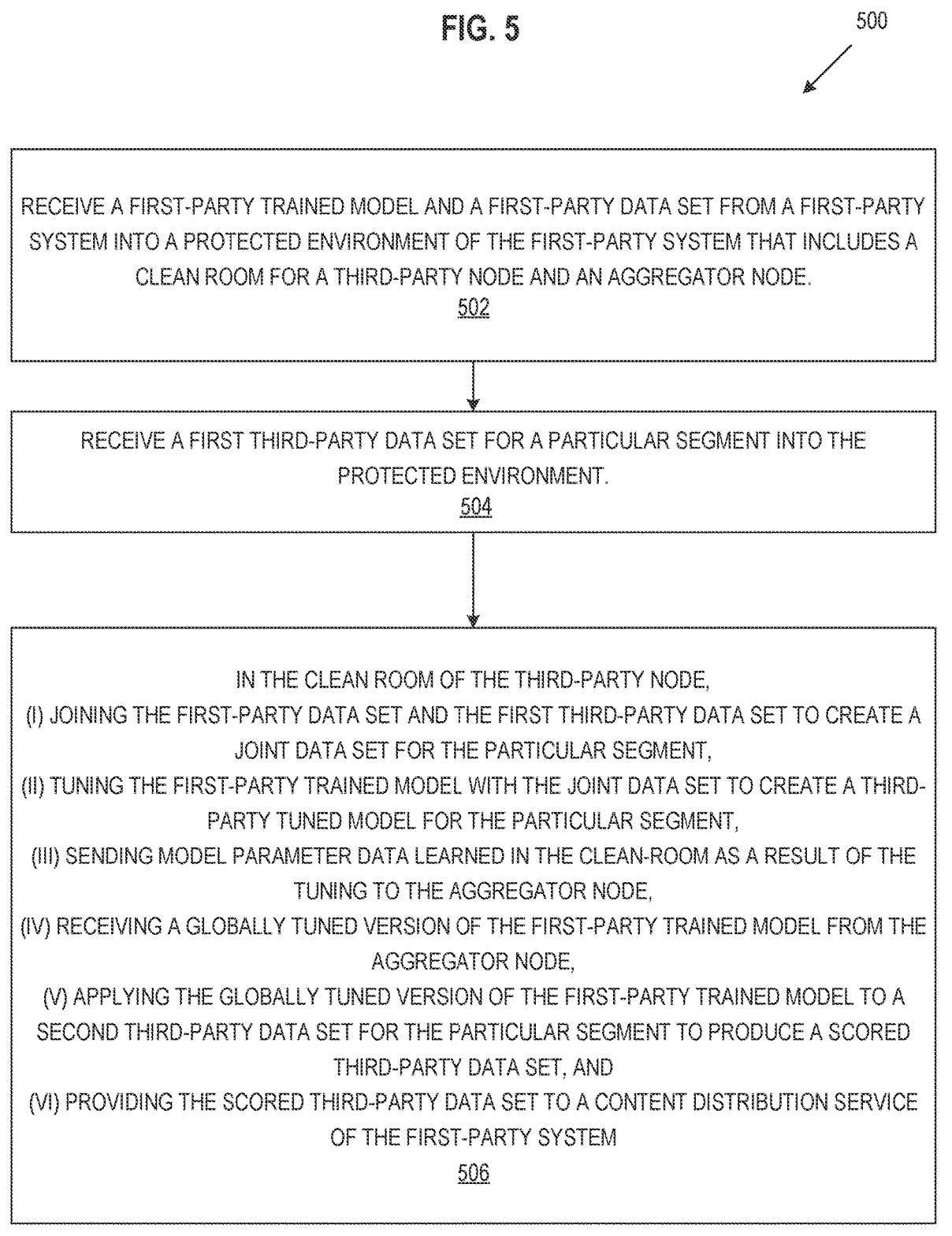

RECEIVE A FIRST-PARTY TRAINED MODEL AND A FIRST-PARTY DATA SET FROM A FIRST-PARTY SYSTEM INTO A PROTECTED ENVIRONMENT OF THE FIRST-PARTY SYSTEM THAT INCLUDES A CLEAN ROOM FOR A THIRD-PARTY NODE AND AN AGGREGATOR NODE.
502

RECEIVE A FIRST THIRD-PARTY DATA SET FOR A PARTICULAR SEGMENT INTO THE PROTECTED ENVIRONMENT.
504

IN THE CLEAN ROOM OF THE THIRD-PARTY NODE,
(I) JOINING THE FIRST-PARTY DATA SET AND THE FIRST THIRD-PARTY DATA SET TO CREATE A JOINT DATA SET FOR THE PARTICULAR SEGMENT,
(II) TUNING THE FIRST-PARTY TRAINED MODEL WITH THE JOINT DATA SET TO CREATE A THIRD-PARTY TUNED MODEL FOR THE PARTICULAR SEGMENT,
(III) SENDING MODEL PARAMETER DATA LEARNED IN THE CLEAN-ROOM AS A RESULT OF THE TUNING TO THE AGGREGATOR NODE,
(IV) RECEIVING A GLOBALLY TUNED VERSION OF THE FIRST-PARTY TRAINED MODEL FROM THE AGGREGATOR NODE,
(V) APPLYING THE GLOBALLY TUNED VERSION OF THE FIRST-PARTY TRAINED MODEL TO A SECOND THIRD-PARTY DATA SET FOR THE PARTICULAR SEGMENT TO PRODUCE A SCORED THIRD-PARTY DATA SET, AND
(VI) PROVIDING THE SCORED THIRD-PARTY DATA SET TO A CONTENT DISTRIBUTION SERVICE OF THE FIRST-PARTY SYSTEM
506

DECENTRALIZED CROSS-NODE LEARNING FOR AUDIENCE PROPENSITY PREDICTION

TECHNICAL FIELD

A technical field to which the present disclosure relates is the use of machine learning for audience propensity prediction. Another technical field to which the present disclosure relates is digital content distribution.

BACKGROUND

Software applications use computer networks to distribute digital content to user computing devices. The performance of a digital content distribution system can be measured based on signals generated at the recipient user devices. An example of a performance measurement is how well a particular content distribution has reached its target audience. Examples of signals include clicks, conversions, and other user interface events. These signals and/or other information used in the design or execution of a content distribution may be subject to privacy and/or data security restrictions.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example model training method and an example model scoring method, in accordance with some embodiments of the present disclosure.

FIG. 4 is a flow diagram of an example method to implement a deep learning propensity model in accordance with some embodiments of the present disclosure.

FIG. 5 is a flow diagram of an example method for generating a scored data set for a content distribution in accordance with some embodiments of the present disclosure.

DETAILED DESCRIPTION

Figure 1:
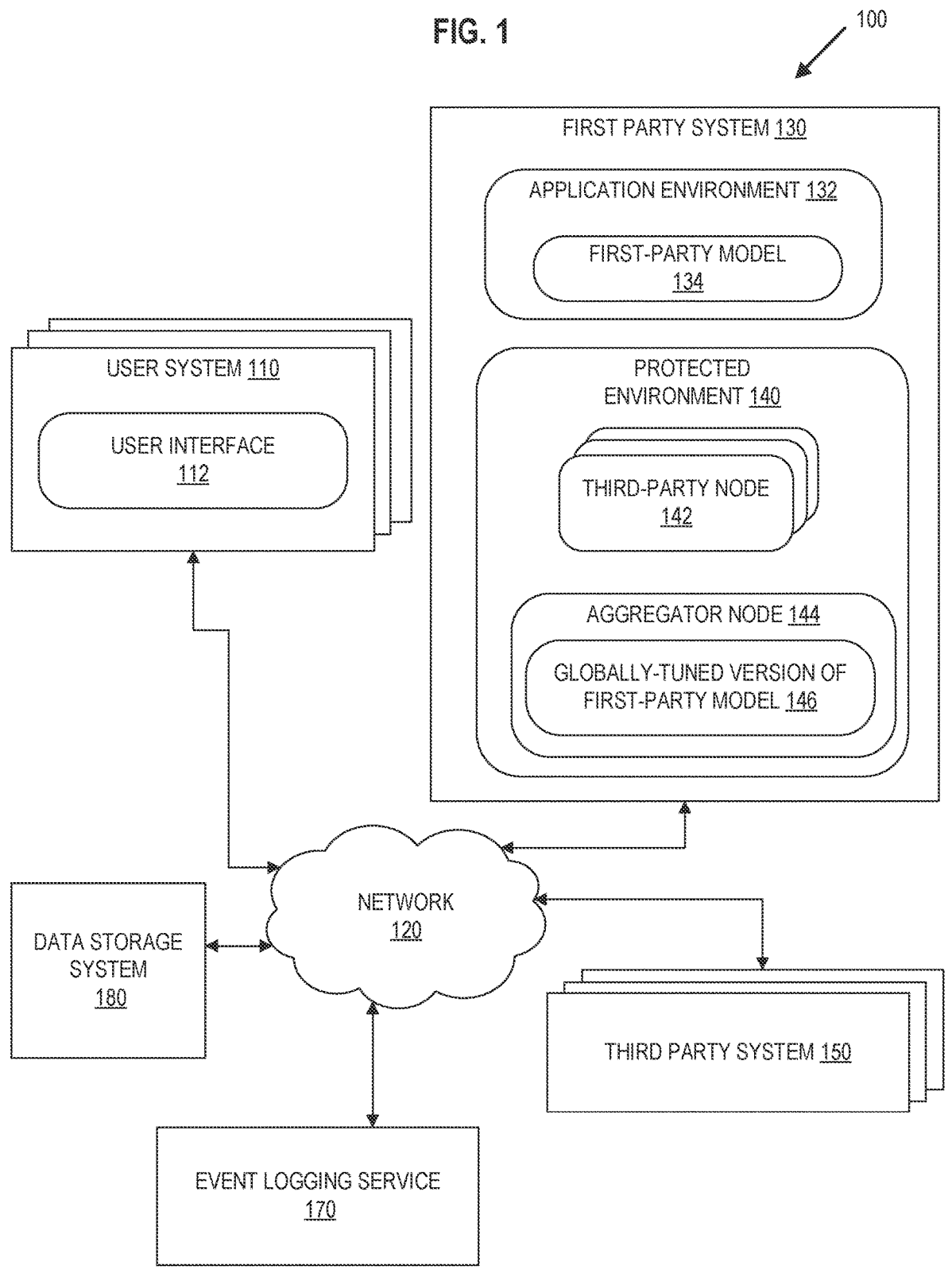
FIG. 1 illustrates an example computing system that includes a first party system in accordance with some embodiments of the present disclosure.

Aspects of the present disclosure are directed to providing a protected environment in which third party propensity models can be tuned in separate clean rooms. In the protected environment, learnings resulting from those tunings can be aggregated and shared across the third-party models without exposing any third party's data to other third parties and without exposing first party data to any third parties. Tuned as used herein refers to a process by which a pre-trained model is further trained on an addition training data set. For example, a generalized model can be further trained, i.e., tuned or fine-tuned, for a specific application by applying the generalized model to an application-specific set of training data.

Any network-based application software system can act as a content distribution system. For example, news and entertainment apps installed on mobile devices, messaging systems, and social graph-based applications can all function as content distribution systems.

Machine learning models are often used to identify target audiences for content distributions. However, privacy and/or data security restrictions may apply to certain information that may be used by the machine learning models to generate propensity predictions. For example, certain third-party information might not be permitted to be shared with other third-party systems, and certain first-party information might not be permitted to be shared with any third-party systems.

Thus, a technical challenge is for machine learning-based propensity prediction systems to implement and enforce applicable privacy and/or data security requirements while also ensuring consistency, reliability, and accuracy of machine learning model output used to generate propensity predictions for content distributions.

Aspects of the present disclosure address the above and other deficiencies by creating a protected execution environment that includes separate clean rooms for different third party nodes, and an aggregator node. Third-party tuning of a first-party model is performed in each of the clean rooms, separately. The aggregator node aggregates learnings computed in the clean rooms based on the tunings and applies those learnings to the first-party model. The aggregator node returns a globally-tuned version of the first-party model to each of the clean rooms for use in further tuning and scoring.

Third party nodes can opt in or out of the aggregations performed by the aggregator node. Third party nodes that opt in send the learnings computed in their respective clean rooms, but not any of the third party data, to the aggregator node, and receive the globally-tuned version of the first-party model from the aggregator node. Third party nodes that opt-out or don't opt-in do not send any learnings or third party data to the aggregator node and do not receive the globally-tuned version of the first-party model from the aggregator node. In this way, third-party data is protected from disclosure to other third party nodes and from disclosure to the first-party system.

Prior approaches combine the third party data (as opposed to just the learnings, only) of multiple different third parties as part of the model training and scoring pipelines. The performance of the disclosed approaches has been shown to achieve performance parity with those prior approaches without combining the third party data as part of the model training or model scoring pipeline. In contrast to the prior approaches, embodiments of the disclosed technologies apply only the learnings from the individual third party tunings (and not the third party data) across the third party models.

The disclosed technologies are described in the context of online network-based digital content distribution. An example of a content distribution use case is audience targeting for the distribution of advertisements for products and/or services over a social network. However, aspects of the disclosed technologies are not limited to ads targeting or to social network applications, but can be used to improve machine learning-based propensity predictions for content distribution more generally.

For example, the disclosed technologies are not limited to use in connection with social graph applications but can be used to provide data security for content distribution systems more generally. The disclosed technologies can be employed by many different types of network-based applications in which content distribution is provided, including but not limited to various types and forms of application software systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a protected environment in accordance with some embodiments of the present disclosure.

In the embodiment of FIG. 1, computing system 100 includes a user system 110, a network 120, a first party system 130, a third party system 150, an event logging service 170, and a data storage system 180.

As described in more detail below, first party system 130 includes an application environment 132 and a protected environment 140. Application environment 132 includes a first-party model 134. An example of a first-party model 134 is a member-to-content distributor propensity model that has been trained on first party data. An example of first party data is data that has been obtained or extracted from first party system 130, which does not include any third party data.

Protected environment 140 includes a number N of third party nodes 142, where N is a positive integer and an aggregator node. An example of a third party node is a machine, such as a server, which is dedicated for the hosting of third party data of a particular third party and no other third party. An example of a third party is a content distributor or another type of entity that supplies audience targeting criteria to first party system 130. An example of an aggregator node is a machine, such as a server, which is dedicated to receiving machine learnings from third party nodes, aggregating those learnings, and tuning a machine learning model based on the aggregated learnings. An example of a learning is a parameter value, such as a weight value, a gradient, or a coefficient, used by a machine learning model to generate predictions, such as propensity scores.

Protected environment 140 is protected in the sense that it is physically and logically separate from application environment 132. For example, protected environment 140 resides on a different set of servers than application environment 132. Protected environment 140 ensures that leakage of sensitive third party data does not occur between the individual third party nodes 142 and/or between aggregator node 144 and any third party node 142. For example, any third party data received into protected environment 140 is encrypted, and operations performed in protected environment 140 are performed on encrypted data. In some embodiments, portions of protected environment 140 are designed to maintain applicable data privacy requirements by, for example, adding noise to data, applying one or more differential privacy mechanisms to third party data and/or first party data, and/or using one or more k-anonymity mechanisms to increase the privacy level of a data set.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of first party system 130 and/or a front-end portion of third party system 150. For example, embodiments of user interface 112 include a graphical display screen that includes one or more slots. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates; however, in a virtual reality, augmented reality, mixed reality, or robotic implementation, a slot may be defined using a three-dimensional coordinate system.

User interface 112 is any type of user interface as described above. User interface 112 can be used to input search queries and view or otherwise perceive output that includes data produced by first party system 130 or third party system 150. For example, user interface 112 can include a graphical user interface and/or a conversational voice/speech interface that includes mechanisms for scrolling and interacting with a news feed, entering a search query, and viewing query results and/or other digital content. Examples of user interface 112 include web browsers, command line interfaces, and mobile apps. User interface 112 as used herein can include application programming interfaces (APIs).

First party system 130 is any type of application software system that provides or enables at least one form of digital content distribution to user systems such as user system 110. Examples of first party system 130 include but are not limited to connections network software, such as social media platforms, and systems that are or are not be based on connections network software, such as general-purpose search engines, job search software, recruiter search software, sales assistance software, content distribution software, learning and education software, or any combination of any of the foregoing.

First party as used herein may refer to a software application that is considered the owner of particular data or that has been granted permission by a user to use certain data. For example, an application that requires users to agree to a set of terms and conditions regarding privacy and/or data security may be considered a first party application with respect to data created as a result of the users' use of the first party application.

Third party system 150 is any type of application software system that provides or enables at least one form of digital content distribution to user systems. Examples of third party system 150 include but are not limited to any type of networked software application including mobile apps such as social media platforms, news and entertainment apps, messaging apps, search engines, or any combination of any of the foregoing.

Third party as used herein may refer to a software application that is different than first party system 130 in terms of its publisher, platform, or other considerations. A third party application may refer to a source of digital content or a software application that is considered the owner of particular data or that has been granted permission by a user to use certain data, which is not the first party system 130. For example, an application that requires users to agree to a set of terms and conditions regarding privacy and/or data security may be considered a third party application with respect to data created as a result of the users' use of the third party application. Certain data owned or used by a third party application 150 is not owned by the first party application 130 and the first party application 130 may not have been granted permission to use that data.

Event logging service 170 captures user interface events such as page loads and clicks in real time, and formulates the user interface events into a data stream that can be consumed by, for example, a stream processing system. For example, when a user of first party system 130 or third party system 150 clicks on a user interface control such as view, comment, share, like, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred. Event logging service 170 is implemented using APACHE KAFKA in some embodiments.

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by first party system 130 and/or third party system 150. Alternatively or in addition, data storage system 180 includes data stores and/or data services that store data received, used, manipulated, and produced by protected environment 140. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, network 120, first party system 130, third party system 150, event logging service 170, and data storage system 180 includes an interface embodied as computer programming code stored in computer memory that when executed causes a computing device to enable bidirectional communication with any other of user system 110, network 120, first party system 130, third party system 150, event logging service 170, and data storage system 180 using a communicative coupling mechanism. Examples of communicative coupling mechanisms include network interfaces, inter-process communication (IPC) interfaces and application program interfaces (APIs).

A client portion of first party system 130 and/or third party system 150 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running first party system 130 and/or a server portion of first party system 130 can receive the input, perform at least one operation using the input, and return output using an HTTP response that the web browser receives and processes.

Each of user system 110, first party system 130, third party system 150, event logging service 170, and data storage system 180 is implemented using at least one computing device that is communicatively coupled to electronic communications network 120. Any of user system 110, first party system 130, third party system 150, event logging service 170, and data storage system 180 can be bidirectionally communicatively coupled by network 120. User system 110 as well as one or more different user systems (not shown) can be bidirectionally communicatively coupled to first party system 130 and/or third party system 150.

A typical user of user system 110 can be an administrator or end user of first party system 130 and/or third party system 150. User system 110 is configured to communicate bidirectionally with first party system 130 and/or third party system 150 over network 120.

The features and functionality of user system 110, first party system 130, third party system 150, event logging service 170, and data storage system 180 are implemented using computer software, hardware, or software and hardware, and can include combinations of automated functionality, data structures, and digital data, which are represented schematically in the figures. User system 110, first party system 130, third party system 150, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Further details with regard to the operations of the protected environment 140 are described below.

Figure 2:
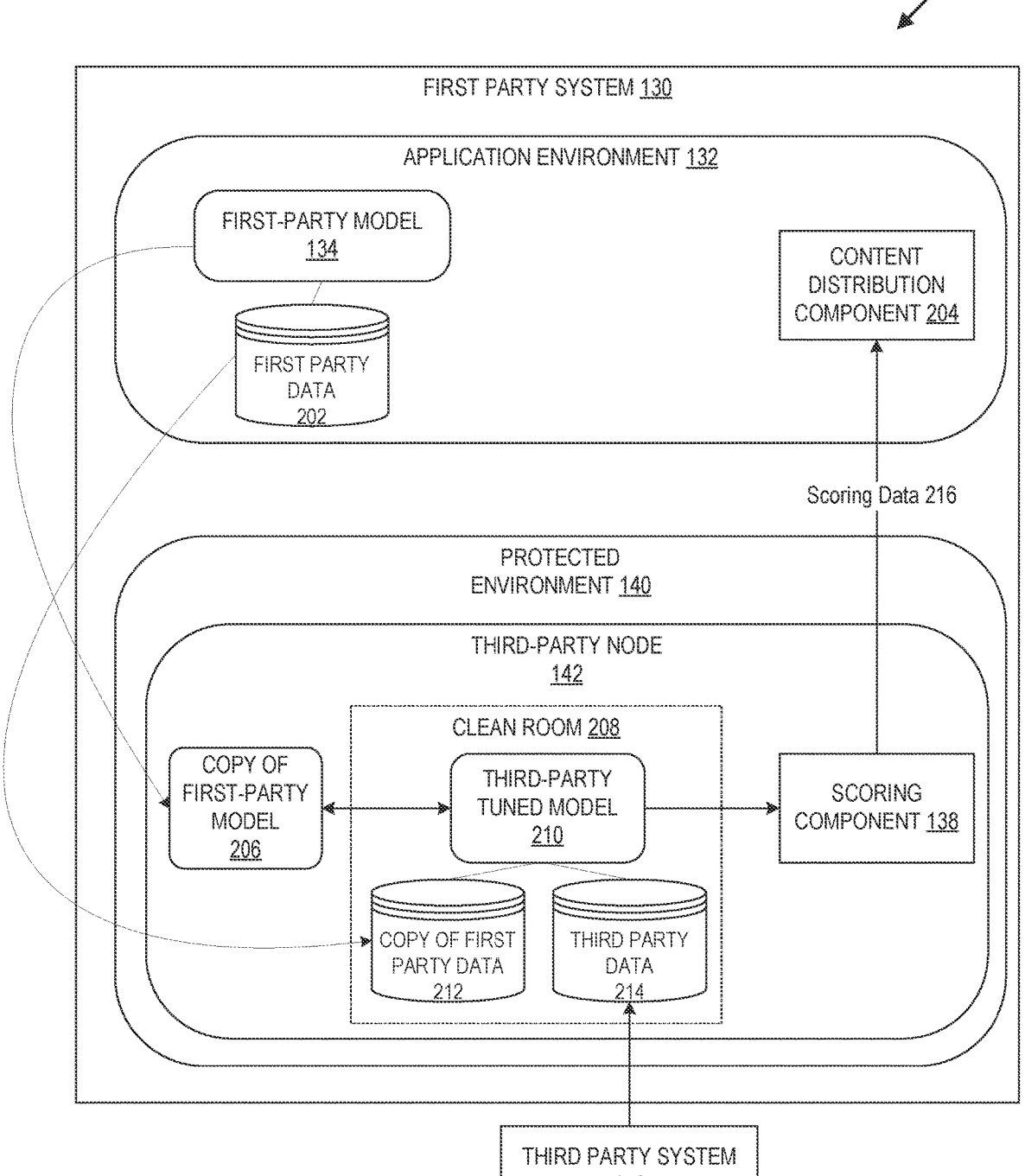
FIG. 2 is a flow diagram of an example method for generating scoring data for a content distribution in accordance with some embodiments of the present disclosure.

FIG. 2 is a flow diagram of an example method 200 for generating scoring data for a content distribution in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the first party system 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
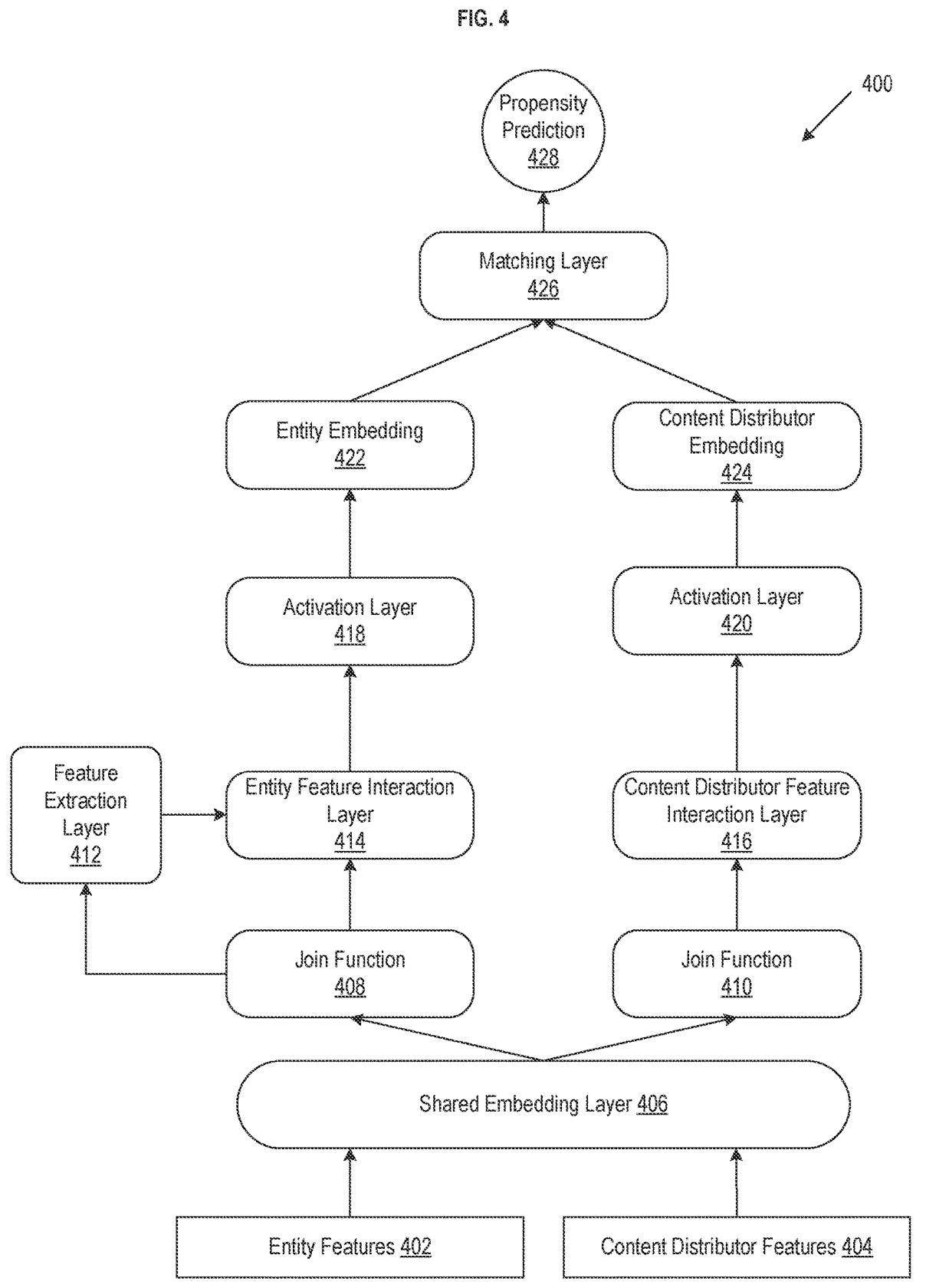

FIG. 2 illustrates an embodiment of first party system 130. In operation, first-party model 134 is created in application environment 132 of first party system 130 using first party data 202. For example, one or more machine learning techniques are applied to first party data 202 to create first-party model 134. An illustrative example of a deep learning architecture that can be used in some embodiments of first-party model 134 is shown in FIG. 4, described below.

In protected environment 140, a third-party node 142 is created for each third party for which the first-party model 134 is to be tuned. FIG. 2 shows only one third-party node 142 and one third party system 150, but FIG. 2 includes N third-party nodes and N corresponding third party systems 150, in some embodiments.

When a third-party tuned version of first-party model 134 is to be created for a particular third party system 150, first-party model 134 and first party data 202 are copied into the third-party node 142 for the particular third party system 150. The copy of first party model 206 copied into third-party node 142 is used to initialize the tuning at third-party node 142.

At third-party node 142, tuning is performed in a data clean room 208. Data clean room 208 logically and physically isolates the copy of first party data 212 and third party data 214 from application environment 132, other third party nodes 142, and from the aggregator node 144. For example, data clean room 208 provides encryption and/or data privacy mechanisms such as differential privacy and k-anonymity, in some embodiments. Data clean room 208 provides mechanisms for manipulating encrypted data, such as encrypted joins, in some embodiments.

As used herein, clean room or data clean room may refer to an isolated environment for data isolation within a server, within a protected environment. For example, a data clean room is a secure, protected environment that enables two or more parties to bring data together for joint analysis with privacy, security, and governance rules in place. A data clean room can enable the joining of distributed datasets securely, without moving or exposing the underlying data. A data clean room also can enable the provisioning of appropriate data access and privacy/governance measures as required separately for each data clean room. Protected environment as used herein can include one or more clean rooms; for example, a protected environment can include a separate clean room for each third party model.

In data clean room 208, tuning is initiated by the receipt of third party data 214 into data clean room 208 from third party system 150. An example of third party data 214 is third party-specific content distribution data; for instance, audience information and/or targeting criteria that is specific to third party system 150. The received third party data 214 and the copy of first party data 212 are used to tune the copy of first-party model 206, thereby creating third party tuned model 210. For example, the received third party data 214 is combined (e.g., joined) with the copy of first party data 212 to create a joint data set (not shown), and third party tuned model 210 is created using the joint data set.

After the completion of tuning at third-party node 142, the third-party tuned model 210 is used by a scoring component 136 to score new data sets. For example, when a set of third party data that is to be scored is received into third party node 142, scoring component 138 applies third-party tuned model 210 to produce scoring data 216. An example of scoring data 216 is a ranked list of entity scores.

Scoring component 138 provides the scoring data 216 to content distribution component 204 of application environment 132. Content distribution component 204 uses scoring data 216 to map content distributions to target audiences, i.e., end users of first party system 130 such that, for example, only certain items of digital content are distributed to only certain specific users of first party system 130.

Content distribution component 204 facilitates access to digital content items across first party system 130. For example, a third party system 150 sends a content distribution request to content distribution component 204, and content distribution component 204 executes the request for the requesting third party system 150. In some embodiments, content distribution component 204 includes a data storage service, such as a web server, which stores digital content items that may be included in a content distribution. In some embodiments, content distribution component 204 processes content distribution requests from, for example, first party system 130 or third party system 150, and distributes digital content items to user systems 110 in response to those requests. For example, content distribution component 204 delivers digital content items to web sites and mobile apps or to particular slots of web sites or mobile app user interface display screens based on scoring data 216.

FIG. 3 is a flow diagram of an example model training method and an example model scoring method, in accordance with some embodiments of the present disclosure.

Portions of the method 300 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the protected environment 140 of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3 depicts details of an embodiment of a node 1 data clean room 208-1, segment 1. Although not specifically shown, other segment-specific data clean rooms of node 1, such as data clean room 208-1, segment 2, and data clean rooms of the N other third party nodes have similar details in some embodiments. As shown, in some embodiments, any third party node 1 . . . N can include more than one data clean room 208. For example, a third party node can include a separate data clean room for each different segment of third party data. An example of a segment is a particular attribute or combination of attributes of an entity, such as job title, location, or company name. The segment-specific data clean rooms within each third party node are logically isolated from each other by the third party node.

Thus, while not specifically shown in FIG. 2, protected environment 140 also includes a mapping component that determines, when a new set of third party data is received from a third party system, which third party node and data clean room to receive the third party data. The mapping component is implemented, for example, by a data structure that stores associations of third party identifiers (IDs) with third party node IDs and data clean room IDs. For example, the mapping component determines the third party ID associated with an incoming data set and searches the data structure for a matching third party ID and then extracts the third party node ID and data clean room ID from the matching entry in the data structure.

Node 1 data clean room 208-1 includes a model training pipeline 302 and a model scoring pipeline 310. Model training pipeline 302 is used to prepare a trained model, such as a third-party version of a first party model or a globally-trained version of the first party model. Once model trainer 308 has produced a trained model, the scoring pipeline 310 uses the trained model to score new sets of third party data.

Model training pipeline 302 includes a data reader 304, a data pre-processor 306, and a model trainer 308. Data reader 304 reads a portion of the copy of first party data 212 that constitutes training data into the data clean room 208-1 and provides all or a subset of first party data 212 to data pre-processor 306. Data pre-processor 306 combines portion of the copy of first party data 212 provided by data reader 304 and a training portion of the third party data 214 read into the data clean room 208-1 from a third party system 150-1 to produce a joint training data set (not shown). For example, data pre-processor 306 semantically aligns the training portion of the copy of the first party data 212 with the training portion of the third party data 214 using, e.g., a taxonomy or a canonical set of features and/or feature categories. Once the first party data 212 and the third party data 214 are semantically aligned, data pre-processor 306 joins the training portion of the first party data 212 and the training portion of the third party data 214 using, for example, an encrypted join operation, to produce the joint training data set. In some embodiments, data pre-processor 306 applies data privacy (e.g., differential privacy, k-anonymity, etc.) to the joint training data set after the join or to the first party data 212 and/or the third party data 214 prior to the join.

Data pre-processor 306 provides the joint training data set to model trainer 308. Model trainer 308 executes one or more machine learning techniques to apply the copy of the first party model 206 to the joint training data set. The model training (or tuning) conducted by model trainer 308 produces learnings in the form of node 1 model parameter data 310-1. Model trainer 308 provides only the learnings 310-1 (and not any of the third party data 214, first party data 212, or joint data set) to aggregator node 144.

Model training pipeline 302 benefits from aggregations of third party learnings performed by aggregator node 144 in that model trainer 308 receives copies of updated first-party model 146 as they are generated by aggregator node 144. For instance, on any given training iteration, model trainer 308 initializes training using updated first-party model 146 produced by aggregator node 144, instead of or in addition to the copy of first-party model 206. Model trainer 308 incorporates updated versions of first-party model 146 into model training over subsequent training iterations using, e.g., a federated learning technique.

Model scoring pipeline 310 includes a data reader 312, a data pre-processor 314, and a model scoring component 316. Data reader 312 reads a portion of the copy of first party data 212 that constitutes scoring data into the data clean room 208-1 and provides all or a subset of first party data 212 to data pre-processor 314. Data pre-processor 314 combines the scoring portion of the copy of first party data 212 provided by data reader 312 and a scoring portion of the third party data 214 read into the data clean room 208-1 from a third party system 150-1 to produce a joint scoring data set (not shown). For example, data pre-processor 314 semantically aligns the scoring portion of the copy of the first party data 212 with the scoring portion of the third party data 214 using, e.g., a taxonomy or canonical set of features and/or feature categories. Once the scoring portion of the first party data 212 and the scoring portion of the third party data 214 are semantically aligned, data pre-processor 306 joins the scoring portion of the first party data 212 and the scoring portion of the third party data 214 using, for example, an encrypted join operation, to produce the joint scoring data set. In some embodiments, data pre-processor 314 applies data privacy (e.g., differential privacy, k-anonymity, etc.) to the joint scoring data set after the join or to the first party data 212 and/or the third party data 214 prior to the join.

Data pre-processor 314 provides the joint data set to model scoring component 316. Model scoring component 316 executes one or more machine learning techniques to apply the copy of the first party model 206 to the joint scoring data set. The model scoring conducted by model scoring component 316 produces scoring data 216 for third party node 1. Model scoring component 316 provides the scoring data 216 to content distribution component 204.

Model scoring pipeline 310 benefits from aggregations of third party learnings performed by aggregator node 144 in that model scoring component 316 receives copies of updated first-party model 146 as they are generated by aggregator node 144. For instance, on any given scoring iteration, model scoring 316 can perform scoring using updated first-party model 146 produced by aggregator node 144, instead of or in addition to the copy of first-party model 206 and/or a third-party tuned model produced by model trainer 308.

Aggregator node 144 receives node-specific learnings, e.g., node 1 model parameter data 310-1 and node N model parameter data 310-N, from multiple different third party nodes. Model updates aggregator 318 of aggregator node 144 aggregates the node-specific learnings and applies the aggregated learnings to the copy of the first party model 206 using, e.g., a federated averaging technique, to generate the updated first-party model 146. The updated first-party model 206 is thereby configured using one or more aggregated model parameter values (e.g., weights or coefficients) instead of the node-specific model parameter values.

Aggregator node 144 provides the updated first-party model 146 to model trainer 308 and model scoring component 316 for subsequent iterations of model training and model scoring, respectively, using e.g., a federated learning technique, as discussed above.

Third party systems can opt in or opt out (or not opt in) to aggregations provided by aggregator node 144. In third party systems that opt in, the above-described methods are applied. In third party systems that do not opt in, the corresponding third party nodes do not send any learnings to aggregator node and do not receive any copies of updated first party model 146 from aggregator node. Thus, in third party systems that do not opt in, third-party tuned model 210 alone is used to generate scoring data.

FIG. 4 is a flow diagram of an example method to implement a deep learning propensity model in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the first party system 130 and/or the protected environment 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4, the method 400 illustrates an example of a flow for a two-tower deep learning neural network. At the input layer, entity features 402 and content distributor features 404 are input to a shared embedding layer 406. Examples of entity features include entity profile data and entity interaction data. Examples of entity profile data include company names, job titles, and skills. Examples of entity interaction data include correlations between entity interactions such as clicks, likes, and shares with associated digital content items. Examples of content distributor features include content item meta data and audience targeting criteria. Entity features 402 and content distributor features 404 each can include different types of features, such as categorical features, numerical features, textual features, or any combination of any of the foregoing.

Shared embedding layer 406 generates shared embeddings based on entity features 402 and content distributor features 404. Join functions 408, 410 are applied to the shared embeddings produced by shared embedding layer 406 to produce joint embeddings. An example of a join function is a concatenation. The joint embeddings produced by joint functions 408, 410 are input to feature interaction layers 414, 416, respectively.

On the entity tower, an additional feature extraction layer 412 extracts feature from the joint embeddings using, e.g., a pooling mechanism, a convolutional neural network, or a self-attention mechanism. Feature extraction layer 412 provides those extracted features, which may represent entity behavioral preference, to entity and content distributor feature interaction layers 414, 416, respectively. Entity feature interaction layer 414 and content distributor feature interaction layer 416 each apply, for example, a self-attention mechanism or pyramid mechanism to their respective inputs.

The outputs of feature interaction layers 414, 416 are input to activation layers 418, 420, respectively. Activation layer 418 generates entity embedding 422. Activation layer 420 generates content distributor embedding 424. Activation layers 418, 420 apply activation functions to the respective inputs. An example of an activation function is tanh.

Matching layer 426 compares entity embedding 422 and content distributor embedding 424. For example, matching layer 426 quantifies the similarities between entity embedding 422 and content distributor embedding 424 using, e.g., a Hadamard function or a cosine function. Matching layer 426 outputs propensity prediction 428. Propensity prediction 428 is an example of scoring data 216. An example of a propensity prediction is a statistical likelihood that a particular entity will interact with a content item distributed by a particular content distributor; for instance, a user-to-advertiser or audience-to-advertiser matching.

FIG. 5 is a flow diagram of an example method for generating a scored data set for a content distribution in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the protected environment 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device receives a first-party trained model and a first-party data set from a first-party system into a protected environment of the first-party system that includes a data clean room for a third-party node and an aggregator node. In some embodiments, operation 502 includes, in the data clean room, semantically aligning the first third-party data set with the first-party data set.

At operation 504, the processing device receives a first third-party data set for a particular segment into the protected environment. In some embodiments, operation 504 includes mapping the first third-party data set to the third-party node. In some embodiments, operation 504 includes mapping the first third-party data set to the data clean room of the third-party node.

At operation 506, the processing device, in the data clean room of the third-party node, joins the first-party data set and the first third-party data set to create a joint data set for the particular segment, tunes the first-party trained model with the joint data set to create a third-party tuned model for the particular segment, sends model parameter data learned in the clean room as a result of the tuning to the aggregator node, receives a globally tuned version of the first-party trained model from the aggregator node, applies the globally tuned version of the first-party trained model to a second third-party data set for the particular segment to produce a scored third-party data set, and provides the scored third-party data set to a content distribution service of the first-party system. In some embodiments, operation 506 includes, in the data clean room, using the globally tuned version of the first-party trained model to create the third-party tuned model. In some embodiments, operation 506 includes, at the third-party node, creating a second data clean room in the protected environment for a second particular segment.

In some embodiments, operation 506 includes, at the protected environment, creating a second third-party node for a second source of a second content distribution. In some embodiments, operation 506 includes, at the protected environment, logically isolating the third-party node from the second third-party node. In some embodiments, operation 506 includes, at the protected environment, logically isolating the aggregator node from the third-party node.

In some embodiments, operation 506 includes checking an opt-in flag of the third-party node, when the opt-in flag indicates that the source has opted in to aggregation, sending the model parameter data to the aggregator node, and when the opt-in flag indicates that the source has not opted in to the aggregation, skipping the sending of the model parameter data to the aggregator node.

In some embodiments, operation 506 includes checking an opt-in flag of the third-party node, when the opt-in flag indicates that the source has opted in to aggregation, receiving the globally tuned version of the first-party trained model from the aggregator node, and when the opt-in flag indicates that the source has not opted in to the aggregation, skipping the receiving of the globally tuned version of the first-party trained model from the aggregator node.

In some embodiments, operation 506 includes receiving a third-party data set for a particular segment into the protected environment, and in a data clean room of a third-party node of the plurality of third-party nodes, learning the model parameter data by applying the first-party trained model to the third-party data set.

In some embodiments, operation 506 includes receiving a third-party data set for a particular segment into the protected environment, receiving the globally tuned version of the first-party trained model into a data clean room of a third-party node of the plurality of third-party nodes, and in the data clean room of the third-party node, learning the model parameter data by applying the globally tuned version of the first-party trained model to the third-party data set.

In some embodiments, operation 508 includes sending the model parameter data learned in the clean room of the third-party node to the aggregator node.

Figure 6:
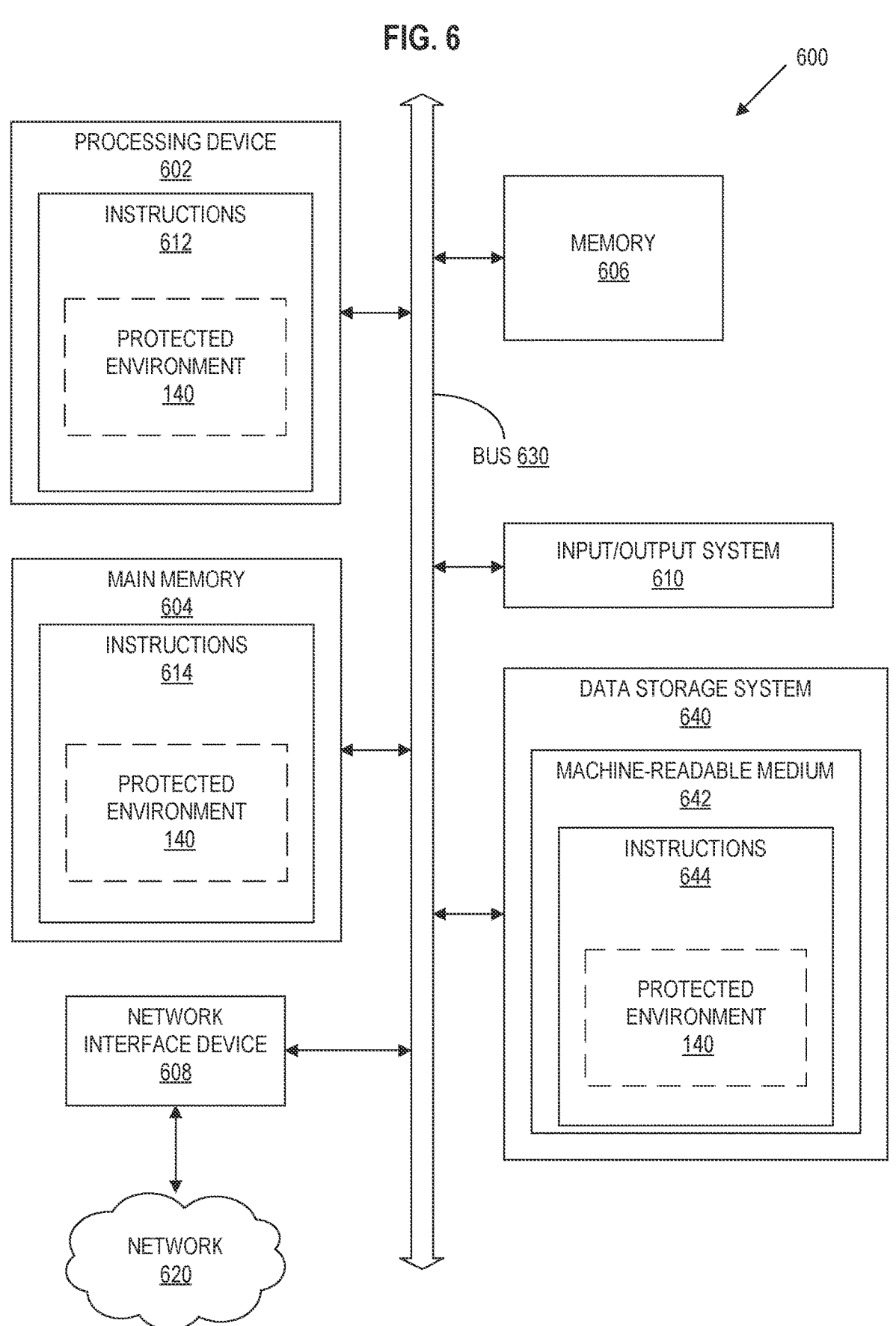
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the first party system 130, including the protected environment 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions the first party system 130 when those portions of the first party system are being executed by processing device 602. Thus, similar to the description above, protected environment 140 is shown in dashed lines as part of instructions 612 to illustrate that, at times, portions of protected environment 140 are executed by processing device 602. For example, when at least some portion of protected environment 140 is embodied in instructions to cause processing device 602 to perform the method(s) described above, some of those instructions can be read into processing device 602 (e.g., into an internal cache or other memory) from main memory 604 and/or data storage system 640. However, it is not required that all of the protected environments be included in instructions 612 at the same time and portions of the protected environment are stored in one or more other components of computer system 600 at other times, e.g., when one or more portions of the protected environment are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a protected environment of a first party system (e.g., the protected environment 140 of FIG. 1).

Dashed lines are used in FIG. 6 to indicate that it is not required that the protected environment be embodied entirely in instructions 612, 614, and 644 at the same time. In one example, portions of the protected environment are embodied in instructions 644, which are read into main memory 604 as instructions 614, and portions of instructions 614 are read into processing device 602 as instructions 612 for execution. In another example, some portions of the protected environment are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving a first-party trained model and a first-party data set from a first-party system into a protected environment of the first-party system; the first-party trained model models propensity correlations between first-party entities and third-party segments; the protected environment includes a plurality of third-party nodes and an aggregator node; a third-party node of the plurality of third-party nodes includes a data clean room; the third-party node is associated with a source of a content distribution; the data clean room is associated with a particular segment that is associated with the content distribution; receiving a first third-party data set for the particular segment into the protected environment; and in the data clean room of the third-party node, (i) joining the first-party data set and the first third-party data set to create a joint data set for the particular segment, (ii) tuning the first-party trained model with the joint data set to create a third-party tuned model for the particular segment, (iii) sending model parameter data learned in the data clean room as a result of the tuning to the aggregator node, (iv) receiving a globally tuned version of the first-party trained model from the aggregator node, (v) applying the globally tuned version of the first-party trained model to a second third-party data set for the particular segment to produce a scored third-party data set, and (vi) providing the scored third-party data set to a content distribution service of the first-party system.

An example 2 includes the subject matter of example 1, and further includes, in the data clean room, semantically aligning the first third-party data set with the first-party data set. An example 3 includes the subject matter of example 1 or example 2, and further includes, at the protected environment, mapping the second third-party data set to the third-party node. An example 4 includes the subject matter of any of examples 1-3, and further includes, in the data clean room, using the globally tuned version of the first-party trained model to create the third-party tuned model. An example 5 includes the subject matter of any of examples 1-4, and further includes, at the third-party node, creating a second data clean room in the protected environment for a second particular segment. An example 6 includes the subject matter of any of examples 1-5, and further includes, at the protected environment, creating a second third-party node for a second source of a second content distribution. An example 7 includes the subject matter of example 6, and further includes, at the protected environment: logically isolating the third-party node from the second third-party node. An example 8 includes the subject matter of any of examples 1-7, and further includes, at the protected environment: logically isolating the aggregator node from the third-party node. An example 9 includes the subject matter of any of examples 1-8, and further includes checking an opt-in flag of the third-party node; when the opt-in flag indicates that the source has opted in to aggregation, sending the model parameter data to the aggregator node; and when the opt-in flag indicates that the source has not opted in to the aggregation, skipping the sending of the model parameter data to the aggregator node. An example 10 includes the subject matter of any of examples 1-9, and further includes checking an opt-in flag of the third-party node; when the opt-in flag indicates that the source has opted in to aggregation, receiving the globally tuned version of the first-party trained model from the aggregator node; and when the opt-in flag indicates that the source has not opted in to the aggregation, skipping the receiving of the globally tuned version of the first-party trained model from the aggregator node.

In an example 11, a method includes: receiving a first-party trained model at an aggregator node of a protected environment of a first-party system; the protected environment includes a plurality of third-party nodes and the aggregator node; each third-party node of the plurality of third-party nodes includes a data clean room; the first-party trained model models propensity correlations between first-party entities and third-party segments; receiving, at the aggregator node, from the plurality of third-party nodes, model parameter data learned in the data clean rooms; at the aggregator node, applying the learned model parameter data to the first-party trained model to create a globally tuned version of the first-party trained model; and providing the globally tuned version of the first-party trained model to the data clean rooms of the plurality of third-party nodes.

An example 12 includes the subject matter of example 11, and further includes: receiving a third-party data set for a particular segment into the protected environment; and in a data clean room of a third-party node of the plurality of third-party nodes, learning the model parameter data by applying the first-party trained model to the third-party data set. An example 13 includes the subject matter of example 11 or example 12, and further includes: receiving a third-party data set for a particular segment into the protected environment; receiving the globally tuned version of the first-party trained model into a data clean room of a third-party node of the plurality of third-party nodes; and in the data clean room of the third-party node, learning the model parameter data by applying the globally tuned version of the first-party trained model to the third-party data set. An example 14 includes the subject matter of example 13, and further includes sending the model parameter data learned in the data clean room of the third-party node to the aggregator node.

In an example 15, a method includes: receiving a first-party data set from a first-party system into a protected environment of the first-party system; the protected environment includes a plurality of third-party nodes and an aggregator node; a third-party node of the plurality of third-party nodes includes a data clean room; receiving a third-party data set for a particular segment into the data clean room of the third-party node; in the data clean room, (i) joining the first-party data set and the third-party data set to create a joint data set for the particular segment, (ii) applying a globally tuned version of a first-party trained model to the joint data set to produce a scored data set, and (iii) providing the scored data set to a content distribution service of the first-party system; the first-party trained model models propensity correlations between first-party entities and third-party segments; the globally tuned version of the first-party trained model is created by the aggregator node applying model parameter data to the first-party trained model; and the model parameter data is learned in the data clean room as a result of tuning the first-party trained model in the data clean room with the joint data set.

An example 16 includes the subject matter of example 15, and further includes, at the protected environment, mapping the third-party data set to the third-party node. An example 17 includes the subject matter of example 15 or example 16, and further includes, at the protected environment, logically isolating the aggregator node from the third-party node. An example 18 includes the subject matter of any of examples 15-17 and further includes: receiving the first-party trained model into the protected environment; the first-party trained model models propensity correlations between first-party entities and third-party segments. An example 19 includes the subject matter of any of examples 15-18, and further includes checking an opt-in flag of the third-party node; the third-party node is associated with a source of a content distribution; when the opt-in flag indicates that the source has opted in to aggregation, applying the globally tuned version of a first-party trained model to the joint data set to produce the scored data set; and when the opt-in flag indicates that the source has not opted in to the aggregation, skipping the applying of the globally tuned version of the first-party trained model to the joint data set. An example 20 includes the subject matter of example 19, and further includes when the opt-in flag indicates that the source has not opted in to the aggregation, tuning the first-party trained model with the joint data set to create a third-party tuned model for the particular segment.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method comprising:
   receiving a first-party trained model and a first-party data set from a first-party system into a protected environment of the first-party system;
   the first-party trained model models propensity correlations between first-party entities and third-party segments;
   the protected environment comprises a plurality of third-party nodes and an aggregator node;
   a third-party node of the plurality of third-party nodes comprises a data clean room;
   the third-party node is associated with a source of a content distribution;
   the data clean room is associated with a particular segment;
   receiving a first third-party data set for the particular segment into the protected environment; and
   in the data clean room of the third-party node, (i) semantically aligning and joining the first-party data set and the first third-party data set to create a joint data set for the particular segment, (ii) tuning the first-party trained model with the joint data set to create a third-party tuned model for the particular segment, (iii) sending model parameter data learned in the data clean room as a result of the tuning to the aggregator node, (iv) receiving a globally tuned version of the first-party trained model from the aggregator node, (v) applying the globally tuned version of the first-party trained model to a second third-party data set for the particular segment to produce a scored third-party data set, and (vi) providing the scored third-party data set to a content distribution service of the first-party system.

2. The method of claim 1, further comprising, at the protected environment, mapping the second third-party data set to the third-party node.

3. The method of claim 1, further comprising, in the data clean room, using the globally tuned version of the first-party trained model to create the third-party tuned model.

4. The method of claim 1, further comprising, at the third-party node, creating a second data clean room in the protected environment for a second particular segment.

5. The method of claim 1, further comprising, at the protected environment, creating a second third-party node for a second source of a second content distribution.

6. The method of claim 5, further comprising, at the protected environment:
   logically isolating the third-party node from the second third-party node.

7. The method of claim 1, further comprising, at the protected environment:
   logically isolating the aggregator node from the third-party node.

8. The method of claim 1, further comprising:
   checking an opt-in flag of the third-party node;
   when the opt-in flag indicates that the source has opted in to aggregation, sending the model parameter data to the aggregator node; and
   when the opt-in flag indicates that the source has not opted in to the aggregation, skipping the sending of the model parameter data to the aggregator node.

9. The method of claim 1, further comprising:
   checking an opt-in flag of the third-party node;
   when the opt-in flag indicates that the source has opted in to aggregation, receiving the globally tuned version of the first-party trained model from the aggregator node; and
   when the opt-in flag indicates that the source has not opted in to the aggregation, skipping the receiving of the globally tuned version of the first-party trained model from the aggregator node.

10. A system comprising:
    a processor; and
    memory coupled to the processor, wherein the memory comprises instructions that when executed by the processor cause the processor to:
       receive a first-party trained model and a first-party data set from a first-party system into a protected environment of the first-party system;
       the first-party trained model models propensity correlations between first-party entities and third-party segments;
       the protected environment comprises a plurality of third-party nodes and an aggregator node;
       a third-party node of the plurality of third-party nodes comprises a data clean room;
       the third-party node is associated with a source of a content distribution;
       the data clean room is associated with a particular segment;
       receive a first third-party data set for the particular segment into the protected environment; and
       in the data clean room of the third-party node, (i) semantically align and join the first-party data set and the first third-party data set to create a joint data set for the particular segment, (ii) tune the first-party trained model with the joint data set to create a third-party tuned model for the particular segment, (iii) send model parameter data learned in the data clean room as a result of the tuning to the aggregator node, (iv) receive a globally tuned version of the first-party trained model from the aggregator node, (v) apply the globally tuned version of the first-party trained model to a second third-party data set for the particular segment to produce a scored third-party data set, and (vi) provide the scored third-party data set to a content distribution service of the first-party system.

11. The system of claim 10, wherein the instructions, when executed by the processor, cause the processor to, at the protected environment, map the second third-party data set to the third-party node.

12. The system of claim 10, wherein the instructions, when executed by the processor, cause the processor to, in the data clean room, use the globally tuned version of the first-party trained model to create the third-party tuned model.

13. The system of claim 10, wherein the instructions, when executed by the processor, cause the processor to, at the third-party node, create a second data clean room in the protected environment for a second particular segment.

14. The system of claim 10, wherein the instructions, when executed by the processor, cause the processor to, at the protected environment, create a second third-party node for a second source of a second content distribution.

15. The system of claim 14, wherein the instructions, when executed by the processor, cause the processor to, at the protected environment:

logically isolate the third-party node from the second third-party node.

16. The system of claim 10, wherein the instructions, when executed by the processor, cause the processor to, at the protected environment:

logically isolate the aggregator node from the third-party node.

17. The system of claim 10, wherein the instructions, when executed by the processor, cause the processor to, at the protected environment, at least one of:

map the second third-party data set to the third-party node;

create a second third-party node for a second source of a second content distribution;

logically isolate the third-party node from the second third-party node; or logically isolate the aggregator node from the third-party node.

18. A non-transitory computer-readable medium comprising instructions that when executed by a processor cause the processor to:

receive a first-party trained model and a first-party data set from a first-party system into a protected environment of the first-party system;

the first-party trained model models propensity correlations between first-party entities and third-party segments;

the protected environment comprises a plurality of third-party nodes and an aggregator node;

a third-party node of the plurality of third-party nodes comprises a data clean room;

the third-party node is associated with a source of a content distribution;

the data clean room is associated with a particular segment;

receive a first third-party data set for the particular segment into the protected environment; and in the data clean room of the third-party node, (i) semantically align and join the first-party data set and the first third-party data set to create a joint data set for the particular segment, (ii) tune the first-party trained model with the joint data set to create a third-party tuned model for the particular segment, (iii) send model parameter data learned in the data clean room as a result of the tuning to the aggregator node, (iv) receive a globally tuned version of the first-party trained model from the aggregator node, (v) apply the globally tuned version of the first-party trained model to a second third-party data set for the particular segment to produce a scored third-party data set, and (vi) provide the scored third-party data set to a content distribution service of the first-party system.

19. The non-transitory computer-readable medium of claim 18, wherein the instructions, when executed by the processor, cause the processor to:

check an opt-in flag of the third-party node;

when the opt-in flag indicates that the source has opted in to aggregation, send the model parameter data to the aggregator node; and when the opt-in flag indicates that the source has not opted in to the aggregation, skip the sending of the model parameter data to the aggregator node.

20. The non-transitory computer-readable medium of claim 19, wherein the instructions, when executed by the processor, cause the processor to:

check an opt-in flag of the third-party node;

when the opt-in flag indicates that the source has opted in to aggregation, receive the globally tuned version of the first-party trained model from the aggregator node; and when the opt-in flag indicates that the source has not opted in to the aggregation, skip the receiving of the globally tuned version of the first-party trained model from the aggregator node.

* * * * *